United States Patent
McDonough

(10) Patent No.: US 7,099,882 B2
(45) Date of Patent: Aug. 29, 2006

(54) METHOD AND SYSTEM FOR FORMING, UPDATING, AND USING A GEOGRAPHIC DATABASE

(75) Inventor: William McDonough, Glen Ellyn, IL (US)

(73) Assignee: Navteq North America, LLC, Chicago, IL (US)

( * ) Notice: Subject to any disclaimer, the term of this patent is extended or adjusted under 35 U.S.C. 154(b) by 484 days.

(21) Appl. No.: 10/426,001

(22) Filed: Apr. 29, 2003

(65) Prior Publication Data

US 2004/0220957 A1    Nov. 4, 2004

(51) Int. Cl.
    *G06F 7/00*      (2006.01)
    *G01C 21/26*    (2006.01)
    *G01C 21/30*    (2006.01)
    *G08G 1/123*    (2006.01)

(52) U.S. Cl. .................. 707/100; 701/200; 701/208; 340/990

(58) Field of Classification Search ............... 701/208, 701/200–211; 707/2–200; 340/995
See application file for complete search history.

(56) References Cited

U.S. PATENT DOCUMENTS

| | | | |
|---|---|---|---|
| 4,888,698 A * | 12/1989 | Driessen et al. | ............ 701/200 |
| 4,937,572 A | 6/1990 | Yamada et al. | |
| 5,170,353 A | 12/1992 | Verstraete | |
| 5,513,110 A | 4/1996 | Fujita et al. | |
| 5,953,722 A * | 9/1999 | Lampert et al. | ............ 707/100 |
| 5,963,956 A | 10/1999 | Smartt | |
| 5,968,109 A | 10/1999 | Israni et al. | |
| 5,974,419 A | 10/1999 | Ashby | |
| 6,035,299 A | 3/2000 | White et al. | |
| 6,047,280 A | 4/2000 | Ashby et al. | |
| 6,107,961 A * | 8/2000 | Takagi | ............ 342/357.13 |
| 6,112,153 A | 8/2000 | Schaaf et al. | |
| 6,122,594 A | 9/2000 | Tamaki et al. | |
| 6,141,454 A | 10/2000 | Seymour et al. | |
| 6,230,098 B1 | 5/2001 | Ando et al. | |
| 6,233,521 B1 | 5/2001 | Nomura | |
| 6,308,177 B1 * | 10/2001 | Israni et al. | ............ 707/100 |
| 6,324,470 B1 | 11/2001 | White | |
| 6,430,497 B1 | 8/2002 | Gaertner et al. | |
| 6,453,233 B1 | 9/2002 | Kato | |

(Continued)

FOREIGN PATENT DOCUMENTS

WO     WO 99/58934     11/1999

OTHER PUBLICATIONS

U.S. Appl. No. 10/201,098, filed Jul. 23, 2002, entitled: Method and System for Updating Geographic Database, by Richard A. Ashby.

(Continued)

*Primary Examiner*—Sam Rimell
*Assistant Examiner*—Rezwanul Mahmood
(74) *Attorney, Agent, or Firm*—Grace Law O'Brien; Frank J. Kozak; Jon D. Shutter

(57) ABSTRACT

A method and system are disclosed for the merging of multiple map databases. These multiple map databases can be stored on separate media. Each map database is comprised of whole parcels and conforms to a baseline parcelization pattern. At run time in a navigation system, a single parcel index is constructed that contains references to parcels from the multiple map databases. References to parcels use a combined media directory covering all media objects. The combined media directory is created by merging tables of contents from each media object. This method can be used to incrementally update a geographic database.

20 Claims, 11 Drawing Sheets

U.S. PATENT DOCUMENTS

| | | |
|---|---|---|
| 6,473,691 B1 | 10/2002 | Winter et al. |
| 6,484,090 B1 | 11/2002 | Lahaije et al. |
| 6,546,334 B1 | 4/2003 | Fukuchi et al. |
| 6,591,270 B1 | 7/2003 | White |
| 2001/0051851 A1 | 12/2001 | Suzuki et al. |
| 2002/0029224 A1 | 3/2002 | Carlsson |
| 2002/0059304 A1 | 5/2002 | Nishiyama |
| 2002/0147545 A1 | 10/2002 | Norimoto |
| 2003/0028315 A1 | 2/2003 | Miyahara |
| 2003/0028316 A1 | 2/2003 | Miyahara |

OTHER PUBLICATIONS

U.S. Appl. No. 10/304,229, filed Nov. 26, 2002, entitled: Method for Organizing Map Data, by William G. McDonough.

Samet, Hanan: "The Strategies for Optimizing the Use of Redundancy in Spatial Databases", *The Design and Analysis of Spatial Data Structures*, ISBN 0-201-50255-0, Chapter 2.4.

Matsuyama, et al.: "A file Organization for Geographic Information Systems Based on Spatial Proximity", *Computer Vision, Graphics, and Image Processing 26*, 303-318. 1984.

* cited by examiner ately designed for navigation purposes. Alternatively,
METHOD AND SYSTEM FOR FORMING, UPDATING, AND USING A GEOGRAPHIC DATABASE

BACKGROUND OF THE INVENTION

The present invention relates to systems and methods for forming, updating and using databases that contain geographic data that are used in computing platforms, such as navigation systems, that provide navigation-related features or services.

Navigation-related functions are provided on various different computer platforms. For example, navigation-related functions can be provided from standalone systems or networked systems. In a standalone navigation system, the software applications, geographic data, and hardware are combined at a single location. A standalone system may be installed in a vehicle or carried by a person. In a networked navigation system, some of the software or geographic data are located with the hardware with the user and some of the software or geographic data are located remotely and accessed over a communications system. Navigation-related functions are provided by systems implemented on dedicated platforms in which the hardware and software are specifically designed for navigation purposes. Alternatively, systems that provide navigation-related features can be implemented on general purpose computing platforms (such as personal computers, personal digital assistants, or networked computers) using appropriate software applications and data.

Dedicated navigation systems and general purpose computing platforms that run navigation applications (hereinafter referred to collectively as "navigation systems") provide a variety of useful features and services. For example, navigation systems used in vehicles can provide detailed instructions for driving to desired destinations thereby reducing travel times and expenses. Navigation systems and navigation applications can also search for businesses of a desired type and provide routing guidance to locations of such businesses. Navigation systems and navigation applications can also incorporate real-time traffic information. Navigation systems and applications may also be used by operators of vehicle fleets, such as trucking companies, package delivery services, and so on.

One consideration associated with navigation systems is that geographic data used by the navigation systems become out-of-date. For example, new roads are built, businesses change locations, road construction closes roads, detours are established, museum and restaurant hours change, etc. It is expected that end users, such as vehicle owners who have navigation systems in their vehicles, will want to have the geographic data in their navigation systems updated from time to time.

One way to provide a navigation system user with updated geographic data is to replace the entire geographic database used by a navigation system with a new version containing new, updated data. A consideration with this approach is that a relatively large portion of the data in the new geographic database will be the same as the data in the older version and therefore will not need to have been replaced.

Another way to provide navigation system users with updated geographic data is to provide the user with only the updated data and provide a mechanism whereby the updated data can be applied to the old geographic database. Embodiments for incrementally updating a geographic database are disclosed in U.S. Pat. No. 5,893,113, Ser. No. 10/201,098, filed Jul. 23, 2002 and Ser. No. 10/304,229 filed Nov. 26, 2002, the entire disclosures of which are incorporated by reference herein.

Although the embodiments disclosed in U.S. Pat. No. 5,893,113, Ser. No. 10/201,098, and Ser. No. 10/304,229 are satisfactory, there continues to be room for further advancement. Accordingly, there exists a need for a way to provide for updating a geographic database used in a navigation system.

SUMMARY OF THE INVENTION

To address these and other objectives, the present invention includes a method for merging of multiple databases that may be stored on different media. According to an embodiment, a baseline template geographic database is formed. The baseline template geographic database is organized into spatial parcels. This organization is referred to as the baseline parcelization pattern. Each spatial parcel is assigned a unique ID based on its position in a binary tree index that corresponds to the location of the geographic area that contains the features represented by the data contained in the parcel. Multiple partial databases, each comprised entirely of whole parcels, can be extracted from the baseline template geographic database and used independently. Because the parcels in these partial databases are consistent, i.e., they correspond to the same baseline parcelization pattern, one or more partial databases can be merged into a single database. These partial databases can be stored on separate media.

At run time, a single parcel index is constructed in memory or on writable media in an end user's navigation system. The single parcel index contains references to parcels from all of the partial databases. A parcel representing the same geographic area may be present in more than one of these partial databases. In that case, only one of the duplicate parcels is entered into the parcel index. If the parcels that represent the same geographic area are not the same version, a data access layer, which is a program in the end user's navigation system, selects the most up-to-date version of the parcel. This method is used to incrementally update a geographic database. References to parcels use media tables of contents stored on each media object. The multiple media tables of contents are merged to create a combined media directory covering all media objects.

DETAILED DESCRIPTION OF THE PRESENTLY PREFERRED EMBODIMENTS

I. Overview of Database Formation, Updating and Distribution Processes.

Figure 1:
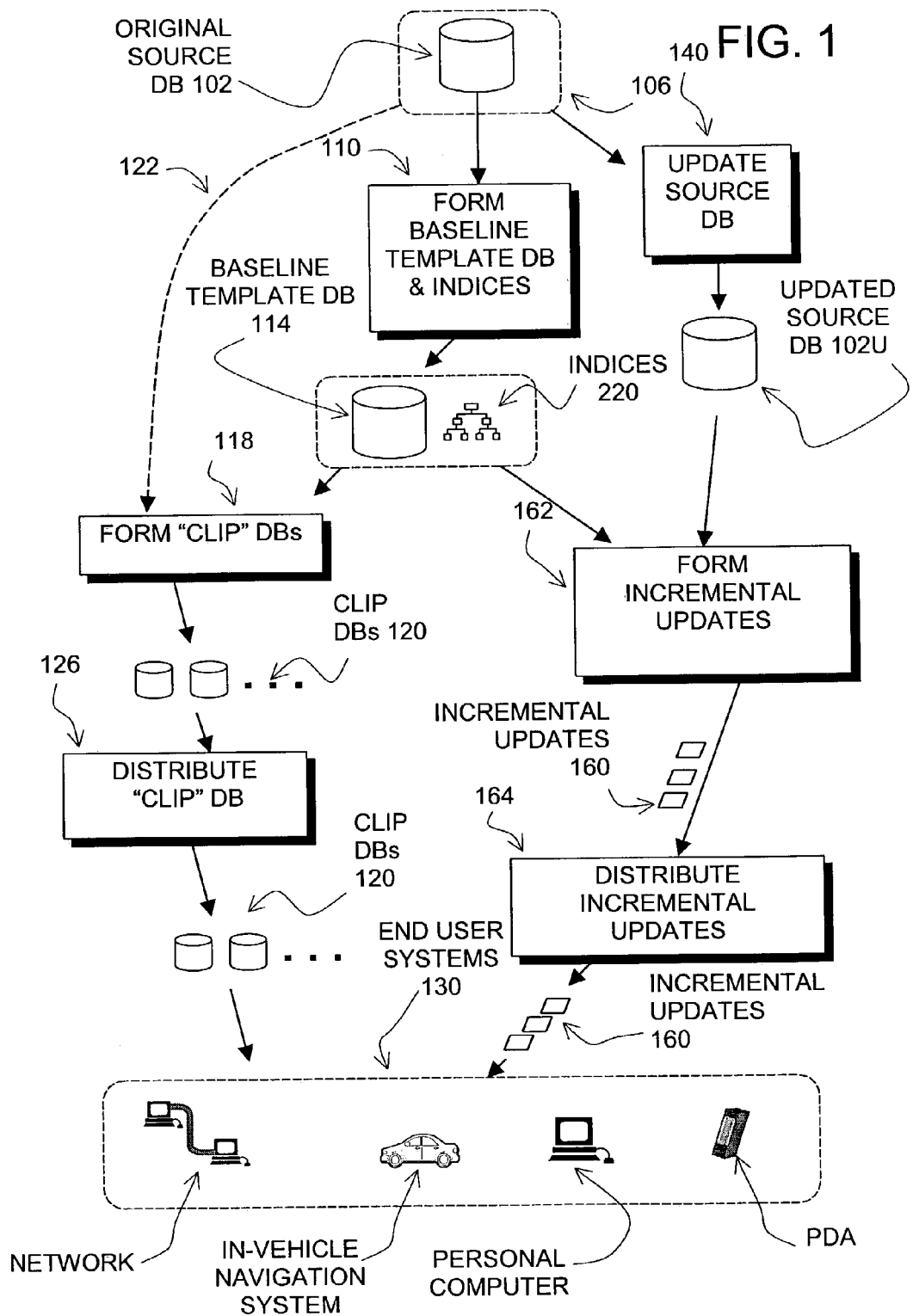
FIG. 1 is an illustration showing processes for forming, updating and distributing geographic databases for end users' navigation systems.

FIG. 1 illustrates processes for forming, distributing and updating geographic databases used in end users' navigation systems. In FIG. 1, a source version 102 of a geographic database contains data that represent geographic features in a coverage region. The coverage region may correspond to an entire continent, such as North America or Europe. Alternatively, the coverage region may correspond to a single country, such as the United States, or several countries, such as the United States and Canada, or France, Germany, and Italy, and so on. According to another alternative, the coverage region may correspond to only a portion of a country, such as the West Coast or the Midwest of the U.S. Although the source version 102 of the geographic database includes data that represent geographic features in the entire coverage region, there may be parts of the coverage region that contain geographic features that are not represented by data in the source version 102 of the geographic database, or for which the representation of geographic features is sparse.

Among the geographic features represented by data in the source version 102 of the geographic database are the roads located in the coverage region. The data about the roads include various kinds of information, such as the geographic coordinates of positions of the roads, street names of the roads, addresses ranges along the roads, locations of intersections, turn restrictions at intersections of roads, and so on. The source version 102 of the geographic database may also include data about points of interest in the coverage region. Points of interest may include hotels, restaurants, museums, stadiums, offices, automobile dealerships, auto repair shops, etc. The source version 102 of the geographic database may include data about the locations of these points of interests. The source version 102 of the geographic database may also include data about places, such as cities, towns, or other communities. The source version 102 of the geographic database may include other kinds of information.

The data about the geographic features in the coverage region are collected by a geographic database developer, such as Navigation Technologies Corporation of Chicago, Ill. However, it is understood that the inventive concepts disclosed herein are not restricted to any particular source of data.

The source version 102 of the geographic database is maintained as the copy that has the most up-to-date data relating to the coverage region. Accordingly, the source version 102 of the geographic database is updated, expanded, and/or otherwise modified on a regular and continuing basis. The geographic database developer may use different ways to collect data for updating, expanding or modifying the source version of the geographic database. These ways include obtaining data from other sources, such as municipalities or aerial photographs. In addition, the geographic database developer may employ field personnel that travel by vehicle along roads throughout the coverage region to observe features and record information about them. In addition, methods for collecting data are described in U.S. Pat. No. 6,047,234 and U.S. Pat. No. 6,381,537, the entire disclosures of which are incorporated by reference herein. The data collected by the geographic database developer are stored in the source version 102 of the geographic database.

To facilitate the updating, maintenance, and development operations, the source version 102 of the geographic database is stored in a suitable format. Examples of suitable formats include the VSAM format and the GDF format, although other kinds of formats, both proprietary and non-proprietary, may be suitable. In general, the format of the source version 102 of the geographic database is not suitable for use in navigation systems.

A copy of the source version 102 of the geographic database is physically located at a first location 106. In one embodiment, the source version 102 of the geographic database is stored on suitable media, such as one or more hard drives, tapes or other media, and accessed with an appropriate computer. Any suitable computer may be used, such as a mainframe computer, a plurality of networked microcomputers, etc.

The source version 102 of the geographic database is used to make derived database products. In one process (Step 110 in FIG. 1), the source version 102 of the geographic database is used to make a baseline template geographic database 114.

The baseline template geographic database 114 is a compiled version of the geographic database. A compiled version of a geographic database is in a different database format than the source version 102. A compiled version of the geographic database is organized in a manner that facilitates use of the data for providing navigation-related functions in end users' navigation systems. A compiled version of a geographic database is formed using a compiler. The compiler is a software program run on an appropriate computer platform.

In the baseline template geographic database, roads are represented by data entities or records that represent discrete segments of each road. Each segment of a road between adjacent intersections is represented by a separate data record. The database may also include data records that represent aggregations of individual road segments.

The baseline template geographic database also includes data that represent nodes. A node refers to a point located on a road segment. For example, each road segment has two endpoints, i.e., where the road segment connects to another road segment at an intersection or where the road segment dead ends. Each endpoint of a road segment is represented as a node in the baseline template geographic database. In addition, nodes are sometimes used to represent points along road segments other than endpoints. Each node is represented by a separate data record in the baseline template geographic database.

The coverage region of the baseline template geographic database 114 corresponds to the coverage region of the source version 102 of the geographic database, i.e., the baseline template geographic database 114 contains data from the source version 102 that represent the entire coverage region. For example, if the source version 102 contains data that represents an entire continent, the baseline template geographic database 114 contains data that represent the same entire continent.

In FIG. 1, another process (Step 118) is used to form clip geographic databases 120. The clip geographic databases 120 are compiled versions of the source version 102 of the geographic database, i.e., they are organized to facilitate use of the data for providing navigation-related functions in end users' navigation systems. The clip databases are in the same database format as the baseline template geographic database 114. The clip geographic databases 120 may be formed from data in the baseline template geographic database 114, or alternatively, the clip geographic databases 120 may be formed from data in the source version 102 of the geographic database (as indicated by the dashed line 122). The clip geographic databases 120 may include only portions of all the data in the source version of the geographic database 102 or the baseline template geographic database 114. For example, the clip geographic databases 120 may include data that relate to only one or more specific geographic sub-regions within the coverage region of the source version 102 of the geographic database. In another alternative, the clip geographic databases 120 may include fewer than all the data attributes that describe geographic features represented in the source version 102 of the geographic database. For example, a clip geographic database may include data for routing, but not data for map display.

Even though the clip geographic databases 120 may include only a portion of the data in the baseline template geographic database 114, the clip databases 120 are based on the baseline template geographic database 114, i.e., on the baseline parcelization pattern defined for the baseline template geographic database 114, as explained in more detail below.

The clip databases 120 are distributed to end users (Step 126) and used on various kinds of end users' navigation systems 130. For example, the clip databases 120 are used in in-vehicle navigation systems, hand-held portable navigation systems, personal computers (including desktop and notebook computers), and other kinds of devices, such as pagers, telephones, personal digital assistants, etc. The clip databases 120 are also used on networked computing platforms and environments, including systems connected to the Internet.

In the end users' navigation systems 130, the clip databases 120 are stored on suitable media. For example, the clip databases 120 may be stored on CD-ROM disks, hard drives, DVD disks, flash memory, or other types of media that are available now or that become available in the future.

On the end users' navigation systems 130, the clip databases 120 are used by various software applications. For example, the clip databases 120 may be used by software applications that provide navigation-related functions, such as route calculation, route guidance, vehicle positioning, map display, and electronic yellow pages, as well as other kinds of functions.

The geographic database developer continues to collect data that represent the features in the geographic coverage region on an ongoing basis (Step 140). One reason that the geographic database developer continues to collect data is that the features in the coverage region change over time. Accordingly, the geographic database developer collects data about the same features in order to update or confirm the previously collected data about the features. Another reason that the geographic database developer continues to collect data is to expand the coverage of the source version 102 of the geographic database. For example, at one point in time the source version 102 of the geographic database may include only sparse amounts of data for some portions of the coverage region. After that point in time, the geographic database developer collects data about features in those areas that were previously represented by only sparse amounts of data in order to expand the coverage of the source version 102 of the geographic database.

After the source version 102 of the geographic database has been updated, the updated source version (102U in FIG. 1) is used to form incremental updates 160 (Step 162). In forming the incremental updates 160, the update formation process 162 uses the baseline parcelization pattern defined for the baseline template geographic database 114 to determine which data from the updated source version 102U of the geographic database to include in each incremental update. The incremental updates 160 are distributed to end users 130 (Step 164) where the incremental updates 160 are used to update the geographic databases installed in the end users' navigation systems 130.

These processes are described in more detail in the sections that follow.

II. Formation of the Baseline Template Geographic Database

Figure 2:
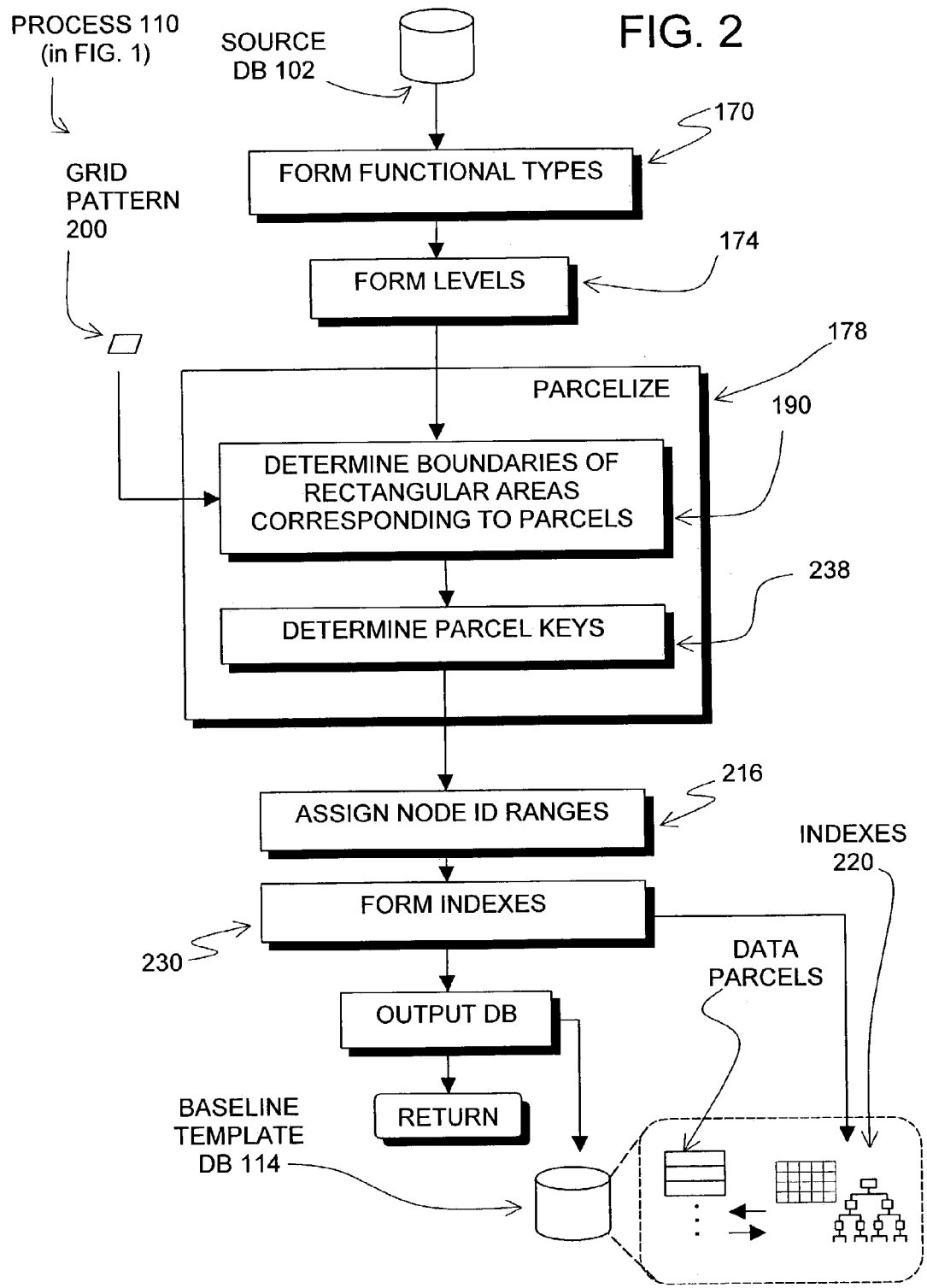
FIG. 2 is a flow chart showing steps in the process shown in FIG. 1 for forming geographic databases for end users' navigation systems.

FIG. 2 shows additional steps of the process (110 in FIG. 1) for forming the baseline template geographic database 114 from the source version 102 of the geographic database. (The steps in FIG. 2 may be performed in a different order than the order shown in the figure.)

A. Formation of Functional Types

Figure 3:
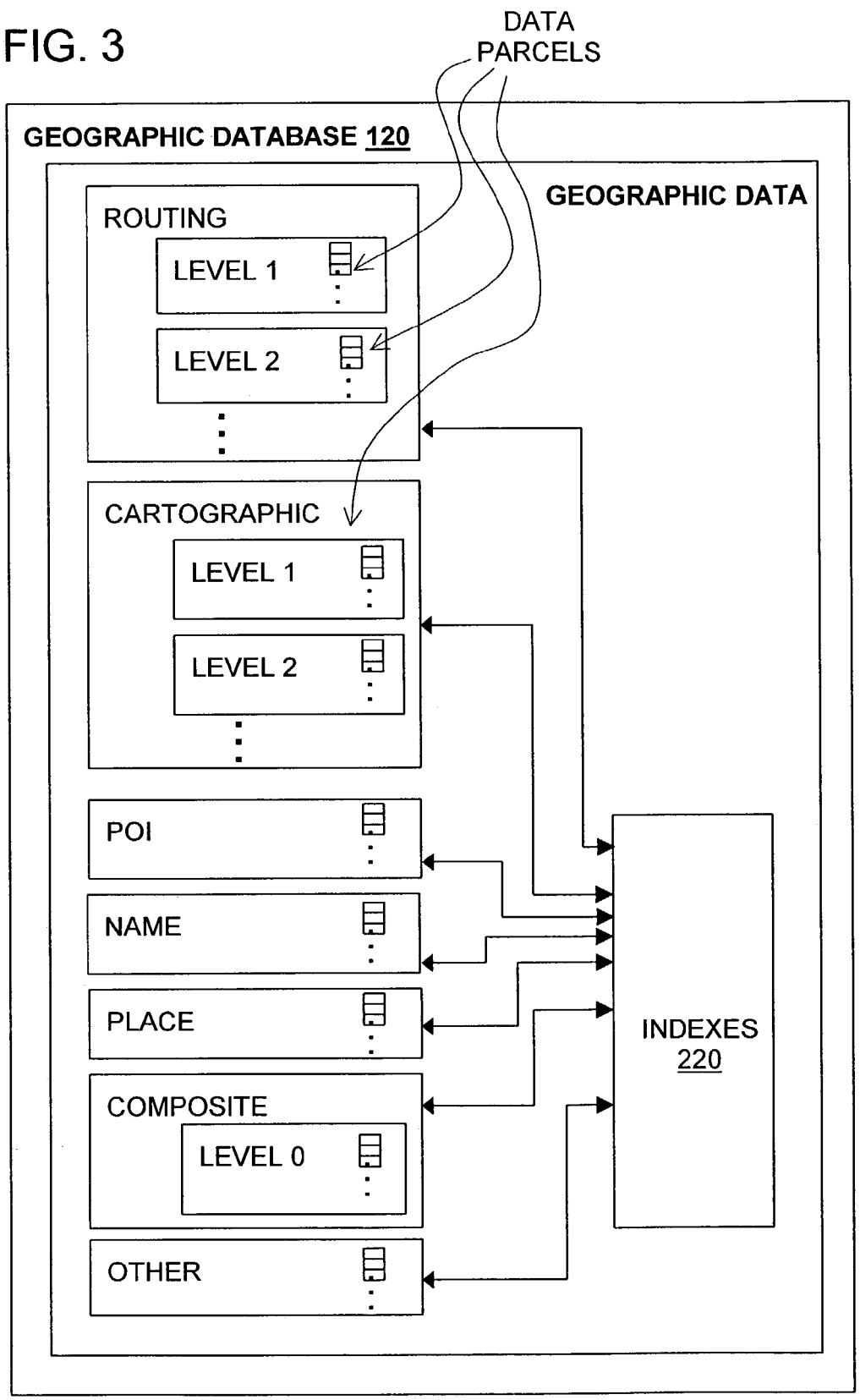
FIG. 3 is a block diagram showing an embodiment for organizing the compiled database in FIG. 2 into functional types.

One way to facilitate performance of a navigation system that uses a compiled geographic database is to provide separate collections or subsets of the geographic data for use by specific navigation-related functions. Accordingly, one of the steps in the process 110 of forming the baseline template geographic database 114 includes forming separate collections of data for different functional types (Step 170). FIG. 3 shows an organization of the compiled baseline template geographic database into several functional types. Each such separate collection includes the data and attributes needed for performing the particular associated function, but excludes data and attributes that are not needed for performing the function. For example, in a compiled database, separate collections may be provided for routing data (for calculating routes), cartographic data (for map display), destination selection data (for finding origins and destinations, such as points-of-interest data and addresses), name data, vehicle positioning data (for locating a vehicle on a road network) and so on. Fewer or more of these different types of data, and other types of data may be defined and included. In addition, one or more of these different types of data may be combined into a composite type (e.g., for providing route guidance and cartographic). To permit these subsets of data types to work together, one or more indexes are included, as explained below.

B. Formation of Levels

Referring to FIG. 2, another step included in the process 110 of forming the baseline template geographic database 114 is forming separate levels for some of the different types of data (Step 174). One or more of these different functional types, such as the cartographic data or the routing data, may be provided in separate levels. FIG. 3 shows the cartographic and routing data organized into levels. Each level comprises a set of the functional type of data at a different level of detail. One way to implement different levels of data is to associate a rank with a represented feature, such as a road segment. The rank may correspond to a functional class. For example, road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes. For example, these may include side streets, alleyways, etc.

The rank of a represented road is used to specify the highest data level in which a data entity that represents the road is included. For example, the routing type data may include separate levels of the data, "level 1", "level 2", etc., each comprising a separate collection of the routing data with a different level of detail, and each of which can be used by the route calculation function in end users' navigation systems. In the routing type of data, level 1 includes the data records that represent road segments having a rank of "0" or higher, thus, level 1 includes data entities corresponding to all the represented portions of all the roads in the geographic region. Level 2 of the routing data comprises a separate subset (or collection) of the routing data and includes only the data entities that represent road segments having a rank of "1" or higher. Level 3 of the routing data comprises a separate subset of the routing data and includes only the data entities that represent road segments having a rank of 2 or higher, and so on. A highest level includes only records having the highest rank. Each higher level includes fewer records, however these records represent roads upon which travel is generally faster. Route calculation may be facilitated by using the higher levels of routing data, whenever possible, e.g., for portions of a route away from the origin or destination.

Similarly, some of the other types of data, such as the cartographic type, may include separate collections of the data, each with a different level of detail, which can be used by the map display function. Using these different levels of cartographic data, the map display function can provide rapid panning and zooming.

Although the organization of some of the types of data into levels results in some duplication of the data, the increased efficiency generally offsets any disadvantages. As with the use of separate functional types of data mentioned above, the need arises to allow these different levels to work together. Indexes, which include cross references, search trees, or other finding techniques, may be provided for this purpose.

C. Parcelization

Referring to FIG. 2, another step included in the process 110 of forming the baseline template geographic database 114 is parcelization (Step 178). Parcelization refers to the arrangement of data entities into specific groupings, called "parcels," so that all the data entities in each parcel are proximate to each other physically or logically in the database. Because the data contained in each parcel are located logically or physically together (i.e., adjacent to each other) in the geographic database, accessing all the data in a parcel at one time can be facilitated when the data are being used. As explained in more detail below, the parcelization pattern developed for the baseline template geographic database is also used for databases (and portions of databases) derived from the baseline template geographic database. Accordingly, the parcelization of the baseline template geographic database 114 is referred to as the "baseline parcelization."

In a present embodiment, each functional type of data in the baseline template geographic database, as well as each level for those types that are organized into levels, is separately organized into parcels. There are different kinds of parcels depending on what aspect (i.e., attribute, characteristic, etc.) of the data is used as the basis for the grouping together of data entities into parcels. For certain functional types of data, such as the routing data and the cartographic data, spatial parcels are formed. In forming spatial parcels, each parcel includes data that represent the geographic features located within a separate respective one of a plurality of areas into which the coverage region represented by the geographic database is divided. In one embodiment, the areas are rectangular although other shapes may be used. Thus, geographic features that are physically located close to each other in a geographic region are represented by data entities that are close to each other in the geographic database. There are various different ways to spatially parcelize geographic data. Embodiments for spatially parcelizing data are described in U.S. patent application Ser. No. 10/304,229. A brief summary of one of the processes for parcelization is described as follows.

In a present embodiment, even though each functional type of data (and each level of some of the functional types) is parcelized separately, for the types and levels of data that are spatially parcelized, the parcelization patterns are related, i.e., the same division pattern is followed to form the areas with which parcels of the different types or levels are associated. This provides several advantages, such as the ability to share indexes and data entity IDs, as explained below. In one embodiment, one functional type is spatially parcelized first, and then the other functional types and levels to be spatially parcelized are parcelized using the same division pattern determined for the first functional type.

Referring to FIG. 2, forming parcels includes the step of determining the boundaries of the areas corresponding to spatial parcels (Step 190). The selection of the locations of these boundaries determines which geographic features are located in each of the rectangular areas formed by the boundaries, which in turn affects the resultant data sizes of the corresponding parcels. The data sizes of parcels and the relative sizes of parcels to each other can be factors that affect the performance of the end users' navigation systems. Accordingly, the selection of the boundaries of the areas corresponding to parcels can be used as a way to improve performance of end users' navigation systems.

There are different approaches to choosing data sizes of parcels. As an example, it may be preferable that the parcels all have a data size that falls within a predetermined range of data sizes. Alternatively, it may be preferable that each parcel has a size that is close to, but does not exceed, a target data size. According to another alternative, it may be preferable that the number of geographic features represented in each parcel be approximately the same. Other approaches may be used.

According to one present embodiment, the number of nodes located in the resultant rectangular areas formed by selection of a boundary line position is used as a metric for determining the rectangular areas corresponding to parcels. (As stated above, a "node" is an endpoint of a represented road segment, i.e., where one road intersects with another road or where a road dead ends.) In one embodiment, the rectangular areas corresponding to parcels are formed by successive bisections of the entire coverage region of the geographic database. The locations at which the bisections are made do not necessarily divide an area into two rectangular parts of equal areas, but are selected so that the resultant rectangular areas formed by each bisection include approximately the same number of nodes. Thus, the step (190 in FIG. 2) of determining the boundaries of the rectangular areas corresponding to parcels uses data of a level or type of the geographic database to determine the number of nodes encompassed in the resultant rectangular areas formed by successive bisections of the entire geographic coverage region.

The step 190 of determining the boundaries of the rectangular areas corresponding to parcels uses a predetermined grid pattern. Accordingly, the step 190 receives data 200 that define this predetermined grid pattern. In a present embodiment, the boundary lines of the rectangular areas corresponding to parcels are constrained to coincide with the predetermined grid pattern. The predetermined grid pattern divides the geographic region represented by the geographic database into fixed sized, rectangular areas, referred to herein as "tiles." In a present embodiment, the predetermined grid pattern has an "origin" located at the southwestern-most point of the grid. Each tile may be identified in terms of its location relative to the origin. In one embodiment, the predetermined grid pattern is global, i.e., it divides the entire earth into a plurality of tiles. In this embodiment, the grid pattern has fixed sized (in degrees) tiles that follow along lines of latitude and longitude. In this embodiment, each tile has a north-south dimension of 0.32768 degrees (or 32 k units) and an east-west dimension of 0.49152 degrees (or 48 k units). At the equator, a tile has dimensions of 36.4 km by 54.6 km. At higher latitudes, the east-west dimension decreases as a function of the cosine of the latitude, reaching 27.3 km at 60° north, while the north-south dimension remains constant. For the present embodiment, the origin of the grid pattern is eighty degrees south, thirty degrees west. The coordinates of the grid pattern are defined to be positive, increasing to the north and east. The global grid pattern is 488 tiles north by 732 tiles east for a total of 357,216 tiles. In this example, the northern limit of the grid pattern is 80.236°-north latitude. The eastern limit of the grid pattern is 30.207°-west longitude.

As stated above, when forming spatial parcels, the rectangular areas corresponding to parcels are determined so that the boundaries of the rectangular areas coincide with the predetermined grid pattern. Thus, the rectangular area corresponding to each parcel contains one or more whole tiles. An exception exists for tiles that contain so many geographic features that the data size of a parcel formed from the tile would exceed a desired maximum parcel size. In this situation, the geographic area corresponding to the tile (referred to as a "dense tile") is divided into smaller rectangular areas so that more than one parcel of data is formed from these dense tiles. In a present embodiment, the selection of the boundaries for the smaller rectangular areas formed from a dense tile is constrained to coincide with another smaller grid pattern associated with the dense tile. A process for determining parcels for dense tiles is described in Ser. No. 10/304,229.

D. Node ID Assignment

As mentioned above, in the baseline template geographic database, every node (i.e., each endpoint of a represented road segment) is represented by a data entity or record. Each node has an identification number or code, referred to as a "node ID." In a present embodiment, node IDs are assigned during the compiling of the baseline template geographic database (Step 216 in FIG. 2).

Node IDs are assigned so that each spatial parcel (within a type or level) has a distinct, unique range of node IDs. Node IDs within a parcel are assigned in sequence. However, there may be gaps in the sequence. In a present embodiment, a number of unused node IDs are reserved at the end of the range for each parcel to allow for future additions.

(Nodes that have coordinates located exactly on a southern or western boundary of the rectangular area from which a parcel is formed are assigned to that parcel. Nodes that have coordinates exactly on northern or eastern boundaries of the rectangular area from which a parcel is formed are assigned to the adjacent parcel.)

Node IDs are shared by the different functional types and different levels of data. That means that the node ID used to identify a node in the cartographic data is also used to identify the same node in the routing data. Likewise, the node ID used to identify a node in level 1 of the cartographic data is also used to identify the same node in level 2 of the cartographic data (assuming the node is present in level 2).

Because higher level parcels (e.g., levels>0) of a functional type are formed from rectangular areas defined by the parcelization division pattern used for the formation of lower level parcels, the range for a higher level parcel contains the consecutive ranges for all included lower level parcels. This also means that the ranges of node IDs in higher level parcels are distinct from each other. Because of this feature, a parcel of any type or level can be uniquely identified by any node ID in that parcel.

E. Formation of Indexes

Figure 4:
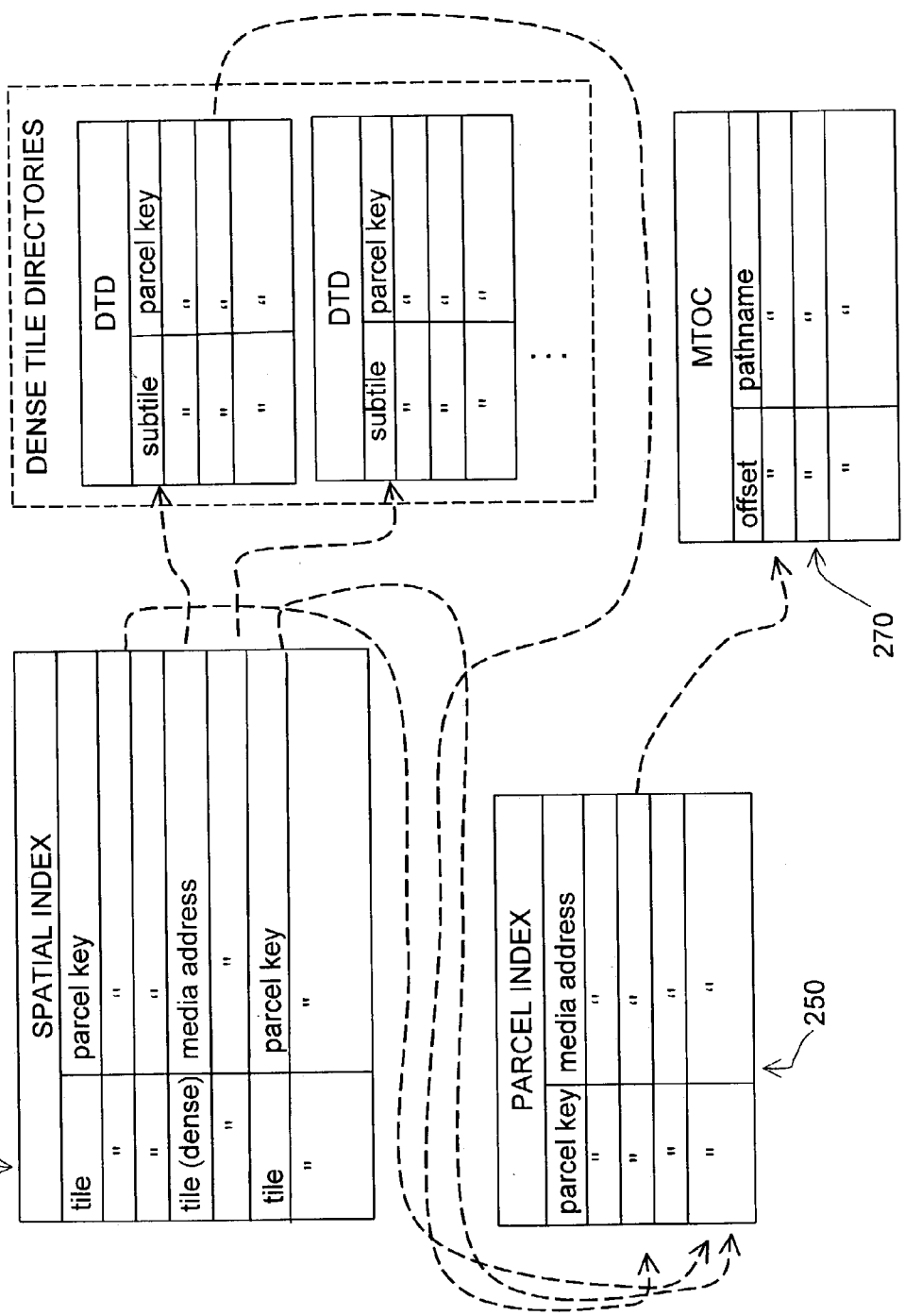
FIG. 4 is a block diagram that shows indexes formed as part of the process shown in FIG. 2.

Part of the process 110 of forming the baseline template geographic includes the formation of indexes 220 (Step 230 in FIG. 2). The indexes 220 are used in the end users' navigation systems 130 to locate data contained in the compiled geographic databases. More specifically, the indexes 220 are used to find the specific parcel that contains the data needed for an application in the end user's navigation system. Referring to FIG. 4, the indexes 220 include a spatial index 240, a parcel index 250, one or more dense tile directories 260 and a media table of contents 270.

1. Parcel Type, Parcel Key and Version Number

A parcel can be characterized by parcel type, parcel key, and parcel version. All the parcels in the original version of the baseline template geographic database have a parcel version of zero. The parcel version is incremented each time a database or update containing the parcel is released and the contents of the parcel have changed, as explained below. The parcel version number is reset to zero whenever a new baseline template geographic database (i.e., with a new baseline parcelization) is created.

The parcel type indicates what functional kind of data the parcel contains. The parcel type is a number, e.g., composite=0, cartographic=1, routing=2, and so on. The parcel type number may also define the level for a type that has levels.

The parcel key is a number assigned by the compiler when the baseline template geographic database is formed (Step 238 in FIG. 2). In a present embodiment, parcel keys are whole integers less than 16,777,216 ($2^{24}$). The combination of parcel type and parcel key is unique across the entire baseline template geographic database.

Figure 5:
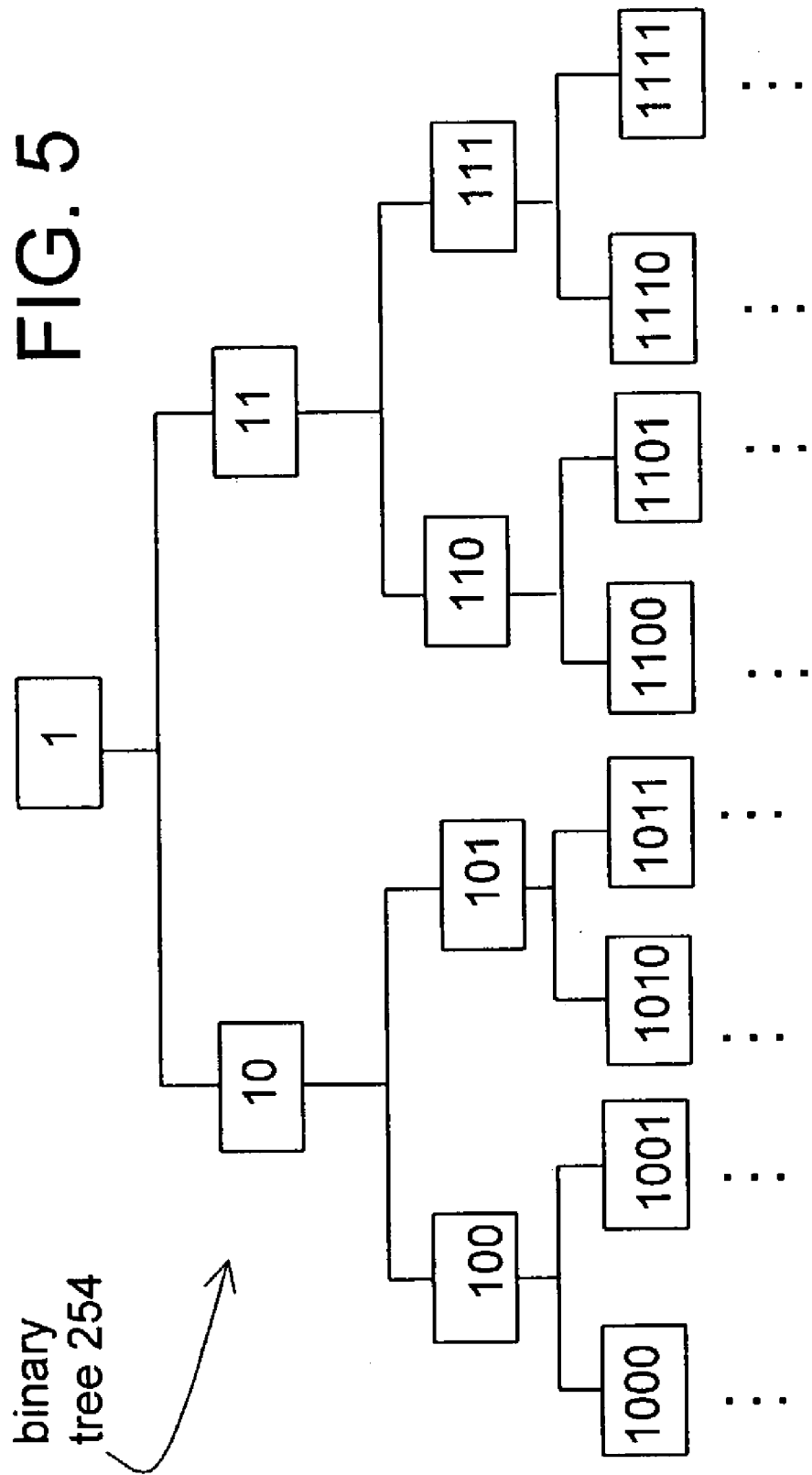
FIG. 5 illustrates a binary tree that represents the organization of the parcel index shown in FIG. 4.
Figure 6A:
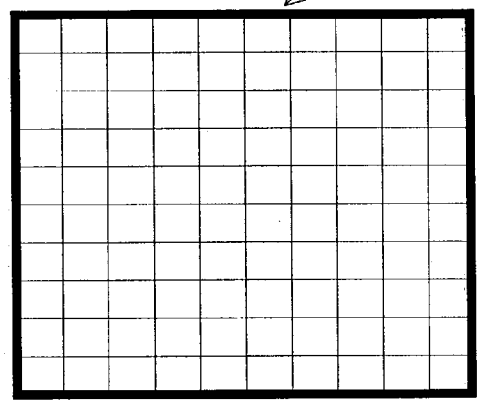
FIGS. 6A–6D depict the divisions of a geographic region represented by the binary tree of FIG. 5.
Figure 6B:
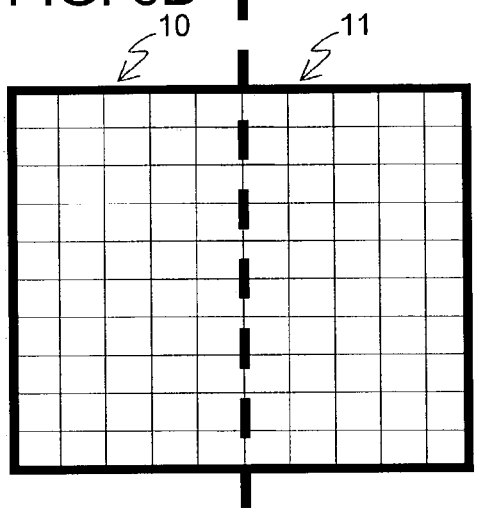
Figure 6C:
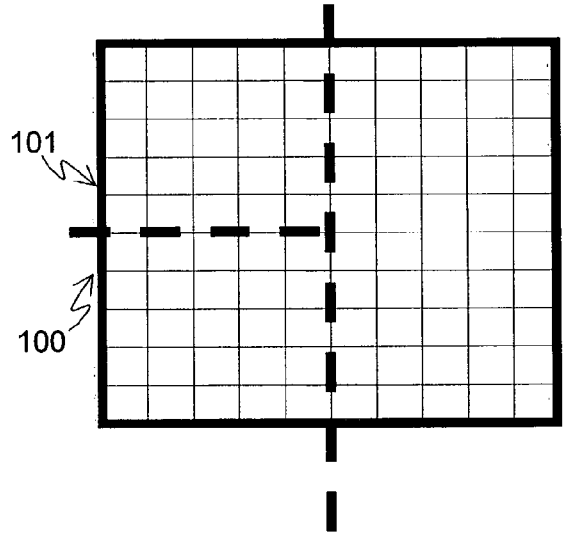
Figure 6D:
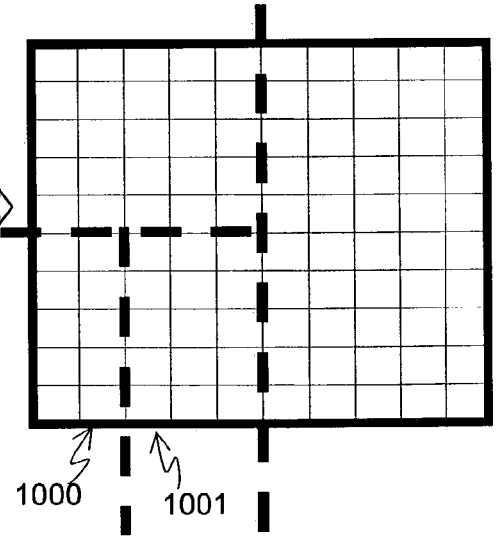

The parcel key is defined relative to the parcel index 250, which is a binary tree. A binary tree 254 is graphically illustrated in FIG. 5 and the geographic divisions corresponding to some of the binary tree nodes are shown in FIGS. 6A–6D. The key for the root of the binary tree, which represents the entire baseline database, is 1. The key for the left child of any tree node (not to be confused with a "node" that represents a road segment endpoint) is parent key<<1 where the notation <<1 indicates a 1-bit left shift. (Similarly, >>1 indicates a 1-bit right shift.)

The key for a right child is
parent key<<1+1.
The parent key is
child key>>1, for either child.

Each tree node in the parcel index tree has a key, whether or not it represents a parcel. The root node of the common subtree for two parcels has the key equal to longest common left bit pattern starting with the highest order 1 bit for both parcels. Every tree node in the binary tree has a depth defined by the bit position of the highest order 1 bit in its key.

The indexes 220 use the parcel keys in several ways. The parcel key is used to identify the parcel in the baseline template geographic database 114 and to find its descriptor in the parcel index 250.

2. Spatial Index

The spatial index 240 is used to locate parcels based on geographic position. The spatial index 240 includes a table that associates parcel keys with tiles. The spatial index 240 associates a parcel key with each tile represented in the baseline template geographic database. The table of tiles is indexed by x and y offset from the southwest corner of the coverage region of the baseline template geographic database. Tiles are numbered, starting from zero, in row order, west to east, then south to north. The spatial index 240 includes a list of parcel keys, one for each tile in the baseline template geographic database, in spatial order by tile number. The position of an entry in the list is the tile number.

The spatial index is not used by itself to find a parcel. Instead, the spatial index is used in conjunction with the parcel index 250. The parcel keys in the spatial index 240 are used as references into the parcel index 250 where each parcel key is associated with one or more parcels. For dense tiles, the entry in the spatial index 240 points to a dense tile directory 260. Specifically, the entry in the spatial index 240 points to the media address of a dense tile directory stored with the parcels for the dense tile.

To locate a parcel using the spatial index 240, a latitude/longitude position is resolved to a single tile within the coverage region. The entry for that tile in the spatial index 240 contains the parcel key for each parcel that includes the data associated with a rectangular area that includes that tile. The parcel keys are references into the parcel index 250 (described below) where media addresses of parcels can be retrieved. If the tile is dense (i.e., contains multiple parcels), the parcel key points to (i.e., by media address) a dense tile directory 260 that can be used to find the desired parcel within the dense tile.

3. Parcel Index

The parcel index 250 is used to locate parcels using the node ID of a node contained in the parcel. As mentioned above, spatial parcels contain data located within rectangular areas formed by successive bisections of the coverage region. The parcel index 250 reflects this division process in the form of a binary tree. As further stated above, node IDs are assigned (Step 216 in FIG. 2) to nodes contained in each rectangular area formed by the division process. As a result, each tree node of the binary tree represents a unique range of node IDs. Some of the tree nodes also represent rectangular areas corresponding to parcels. The two children of a tree node each represent a portion of the parent's node ID range. Each tree node is represented by a record containing the node ID that divides the two sub-ranges. Thus, a parcel containing a node (identified by node ID) can be located by traversing the binary tree and choosing the appropriate child at each tree node, based on whether the target node ID is greater than the node ID stored in that record.

The leaf nodes of the binary tree represent level 0 (composite) parcels. Some non-leaf tree nodes may also represent parcels because the tree represents more than one level of data, i.e., a parcel at a higher level may be divided into two or more parcels at a lower level. Some non-leaf nodes may represent parcels representing dense tiles. The record stored at a tree node that represents a data parcel contains the media address (or a list of the media addresses) for the parcel(s) with the range of node IDs represented by that record. All references to parcels are directed through the media table of contents 270 stored on each media object.

4. Dense Tile Directory (DTD)

As mentioned above, if a tile contains so many features that a single parcel formed from the tile would exceed a maximum desired size for a parcel (i.e., is a "dense tile"), more than one parcel of data is formed to contain the data that represent the features contained in the tile.

The spatial index 240 (described above) does not contain the parcel keys for the parcels contained in dense tiles. Instead, the spatial index 240 points to the address of a dense tile directory 260, which is used to locate data contained in a dense tile. The formation of indexes (Step 230 in FIG. 4) includes the formation of dense tile directories 260. A separate dense tile directory is formed for each tile from which plural parcels are formed.

The dense tile directory 260 is used to find a particular parcel that contains the data corresponding to a geographic position located within the corresponding dense tile. Thus, the dense tile directory 260 is a spatial index for a single dense tile. Each dense tile directory 260 includes a list (or array) of parcel keys, similar to the spatial index 240. As mentioned above, when forming parcels to represent features located in a dense tile, a dense tile grid pattern, that divides the dense tile into 16×16 equal sub-tiles, is used. These sub-tiles are numbered, starting from zero, in row order, west to east, then south to north. A parcel key is included for each sub-tile and the parcel keys are in the same order as the numbered sub-tiles of the dense tile. Each parcel key in the dense tile directory points back to an entry in the parcel index 250. Each parcel key in the list therefore identifies the parcel that contains the corresponding sub-tile.

In a present embodiment, a dense tile directory is stored on the media immediately prior to the parcels contained in the dense tile.

5. Media Table of Contents (MTOC)

To find the actual parcel of data on a media, the parcel index 250 uses a media address that points to an entry in the media table of contents 270. In one embodiment, the media address is a 32-bit word consisting of an index into the media table of contents 270 and an offset, in sectors, from the address specified in the media table of contents for that entry. The media table of contents index n refers to the nth component record of the media table of contents. (The sector size is defined in a database header by an appropriate field.)

F. Further considerations

As mentioned above, each different functional type of data is parcelized separately and for those parcel types that are organized into levels, each level is parcelized separately (Step 178 in FIG. 2 and illustrated in FIG. 3). As stated above, common node IDs are used for all parcel types at all levels. This allows for cross referencing among the different parcel types. In addition, with respect to spatially parcelized data, after the first type of data is spatially parcelized, the parcelization of the other types uses the same division pattern for the boundaries for the rectangular areas corresponding to spatial parcels. Thus, the different data types and levels are aligned. For example, if the composite data is parcelized first, then the rectangular geographic areas corresponding to routing or cartographic parcels correspond exactly to the union of one or more adjacent rectangular geographic areas corresponding to composite parcels.

In connection with the parcelization of the other data types and levels subsequent to the initial type of data to be spatially parcelized, indexes for these parcels are formed. In one embodiment, separate spatial indexes are formed for each level of cartographic data.

As stated above, the range for a higher level parcel contains the ranges for all included lower level parcels. This allows a parcel to be uniquely identified by its type, its level, and any node ID in that parcel.

As mentioned above, this embodiment of the baseline geographic database includes point of interest (POI) data. In this embodiment, the same parcel index 250 used for cartographic, routing and composite data can also be used for POI data. In this embodiment, each POI record is assigned a POI ID. The IDs for POIs are assigned by ranges similarly to the way that the node IDs are assigned. The IDs for POIs are assigned by ranges corresponding to the same rectangular areas associated with the previously formed spatial parcels (of cartographic, routing, or composite data). A POI ID is added to each node in the parcel index 250 to identify the corresponding division into POI ID sub-ranges associated with the geographic division corresponding to the node. Thus, each node in the parcel index includes both a node ID and a POI ID that identify the respective sub-ranges of node IDs and POI IDs. By assigning POI IDs in this manner and including POI IDs that identify POI ID ranges in nodes of the parcel index, the parcel index can be used to identify the parcel that contains a POI data record, given the POI ID of the record.

The process of forming parcels may include other steps, such as forming and storing parcel headers. A parcel header includes information that applies to the entire parcel, such as the baseline database version and the functional type, as well as other parameters. A parcel header may also include information that indicates the parcel key and version.

The formation of the baseline template geographic database 114 may include additional processes, such as the formation of new data types that are not contained in the source version of the geographic database.

III. Using the Complied Geographic Database in End Users' Navigation Systems

According to one embodiment, after the baseline template geographic database has been formed, copies of the baseline template geographic database are distributed and installed in end users' navigation systems 130. In one embodiment, copies of the entire baseline template geographic database 114 are stored on suitable media, e.g., one or more hard disks, DVD disks, etc., which are then installed in end users' navigation systems. Then, the data contained in the baseline template geographic database is used by applications in the end users' systems to provide navigation-related features In order to access the data contained in the compiled geographic database, an end user's navigation system 130 includes a data access layer. Embodiments of a data access layer are described in Ser. No. 10/201,098, U.S. Pat. Nos. 6,047,280 and 6,073,076, the entire disclosures of which are incorporated by reference herein.

Figure 7:
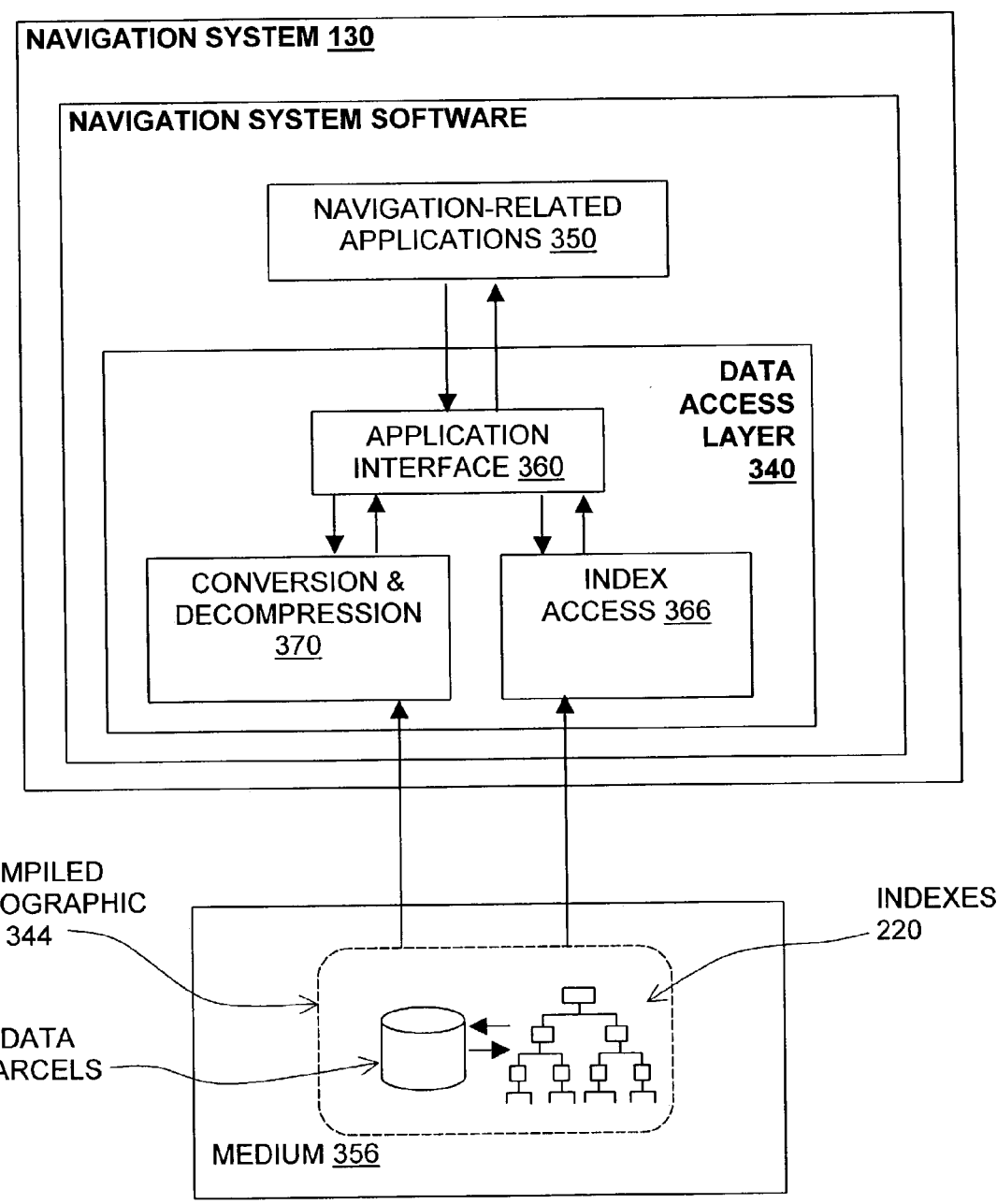
FIG. 7 is a block diagram that shows components in an embodiment of one of the end user navigation systems depicted in FIG. 1.

FIG. 7 shows components of an end user's navigation system 130 that includes a data access layer 340. The data access layer 340 is a software program located and run on the end user's navigation system 130. The data access layer 340 includes a library of software functions. The data access layer 340 is located logically between a compiled geographic database 344 (which in this embodiment is a copy of the baseline template geographic database 114) located on a suitable data storage medium 356 and the navigation applications 350 that use geographic data from the compiled geographic database 350 to provide navigation-related functions.

In one embodiment, the data access layer 340 accepts requests for geographic data from the navigation applications 350 through an API 360, or other suitable interface. The data access layer 340 includes a function 366 that determines which data from the compiled database 344 are needed to respond to a request for data from a navigation application 350 and the location of the data on the medium 356. The data access layer 340 uses the indexes 220 for this purpose. In addition, the data access layer 340 includes a function 370 that reads the data from the medium 356, performs any necessary conversion or decompression and provides the data in a format suitable for use by the requesting application 350.

Figure 8:
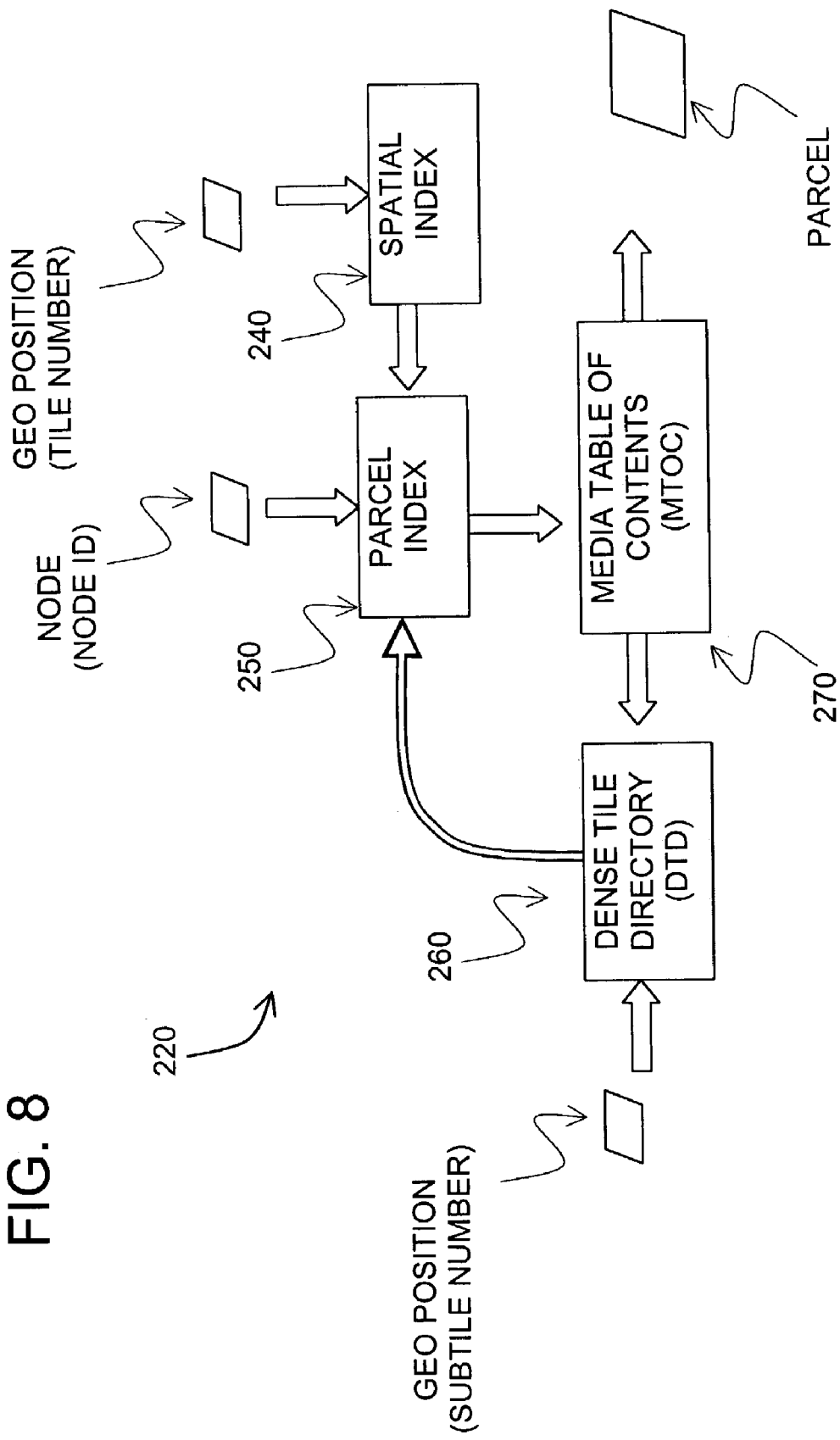
FIG. 8 is a block diagram that illustrates use of the indexes in FIG. 4.

In the data access layer 340, a spatial parcel (e.g., routing, cartographic, composite) can be located on the media 356 in several different ways, including using a geographical location or using a node ID. Referring to FIG. 8, the parcel index 250 is used by the data access layer 340 to locate parcels by the node ID of a node contained in the parcel. Every parcel, whether or not it was formed from a dense tile, has a tree node in the parcel index 250 thereby allowing the parcel to be found using a node ID. Because node IDs are shared by the different data types, the parcel index 250 can be used to locate composite, cartographic, and routing parcels by the node ID of a node contained in the parcel. The parcel index points to a media address (in the media table of contents 270) for each range and sub-range of node IDs in the database.

The spatial index 240 is used for locating a parcel using geographic location. For any given latitude/longitude location, the parcel key corresponding to the parcel that contains the data that represent the geographic features located in the tile containing the location is determined using the spatial index 240. As mentioned above, in a present embodiment there is a separate spatial index 240 for each level of cartographic, routing and composite data. For each tile, the spatial index identifies a parcel key that identifies each parcel that includes data associated with a rectangular area that includes that tile. The parcel key is then used as a reference into the parcel index 250 where media addresses of the parcels associated with the parcel key can be retrieved by reference to the media table of contents. To use the parcel key in the parcel index 250, a pointer is set to the root node of the tree. Then, reference is made to the first bit of the parcel key after the most significant one bit. If the bit is zero, the pointer is set to point to the left child tree node. If the left child is one, the pointer is set it to point to the right child. Then, the next bit to the right is checked and the previous steps are repeated. This process is continued through the least significant bit. The pointer should then be pointing to the node of the parcel. For dense tiles, the entry in the parcel index 250 contains the address of a dense tile directory 260 on the media, stored with the parcels for that tile. The dense tile directory contains parcel keys for all of the parcels within that tile. When working within a tile or group of tiles, the access library 340 may cache an active dense tile directory for rapid access.

IV. Clip Databases

A consideration associated with distribution of copies of the entire baseline template geographic database for use in end users' navigation systems is that the baseline template geographic database 114 is relatively large, especially if it represents a relatively large geographic region, such as an entire continent. In many cases, end users' navigation systems do not have the resources (e.g., memory, data storage, processing power, etc.) to handle a database as large as the entire baseline template geographic database. A further consideration is that many end users may not need data for the entire coverage region of the baseline template geographic database. Accordingly, in one alternative embodiment, copies of geographic databases are formed that contain only portions of all the data which are contained in the baseline template geographic database (Step 118 in FIG. 1), i.e., some of the data contained in the baseline template geographic database is excluded (e.g., omitted). A geographic database that includes only a portion of the entire baseline template geographic database is referred to as a "clip geographic database" or "clip." Because some of the data from the baseline template geographic database is omitted in clip databases, clip databases are smaller in data size than the baseline template geographic database. Clip geographic databases may exclude some data spatially, i.e., some geographic areas within the coverage region represented by data in the baseline template geographic database are not represented in the clip databases. (The geographic area represented by data contained in a clip database is referred to as the clip database coverage region.) Various different clip databases can be formed, e.g., some with relatively large coverage regions and others with relatively small coverage regions. According to another alternative, clip databases may be formed that exclude some data functionally (i.e., some functional types of data in the baseline template geographic database, such as the cartographic data, are not contained in the clip databases). According to another alternative, clip databases may be formed that exclude data both spatially and functionally.

Figure 9:
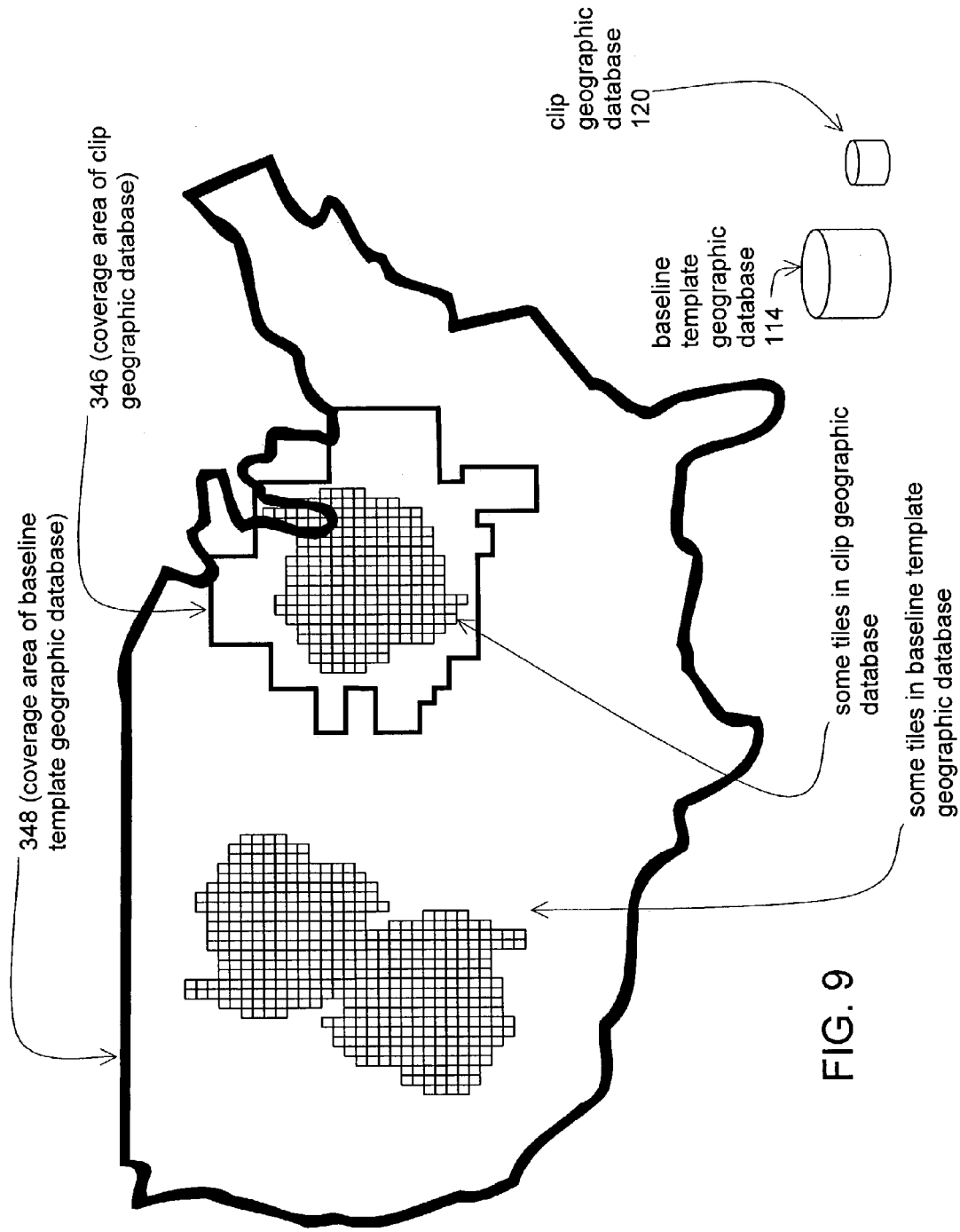
FIG. 9 illustrates a relationship between the coverage region of a clip database and the coverage region of the baseline template geographic database, shown in FIG. 2.

FIG. 9 illustrates a coverage region 346 for a clip database 120. In FIG. 9, the coverage region 348 of the baseline template geographic database 114 corresponds to an entire country. In this embodiment, the clip database 120 includes data that represents geographic features in only a portion of the entire coverage area 348 of the baseline template geographic database.

According to a present embodiment, although a clip geographic database includes only a portion of the data contained in the baseline template geographic database, the clip geographic database includes whole parcels of data from the baseline template geographic database. Further, a clip database follows the same parcelization pattern of the baseline template geographic database, i.e., the baseline parcelization pattern. This means that the boundaries of the rectangular geographic areas corresponding to spatial parcels in the clip databases are the same as the boundaries of the rectangular geographic areas corresponding to parcels in the baseline template geographic database.

In addition to sharing the same baseline parcelization pattern as the baseline template geographic database, the clip databases also share the same node IDs. This means that nodes represented in the clip databases are identified with the same node IDs (identification codes) as in the baseline template geographic database. Note that since a clip database may exclude some data contained in the baseline template geographic database, some ranges of node IDs may be excluded from the clip database.

In a present embodiment, each clip database is provided with a spatial index, a parcel index, a media table of contents, and one or more (or none) dense tile directories, one for each dense tile within the coverage region of the clip database. In the present embodiment, each clip database uses the same spatial index as the baseline template geographic database. (The same spatial index is used for a clip database even though the coverage region of the clip database may not extend to the full dimensions of the coverage region of the baseline template geographic database.) The parcel index formed for a clip database contains entries (i.e., parcel keys) for only those parcels included in the clip database. A parcel index for a clip geographic database starts with the same root record as in the baseline template geographic database. However, because a clip database does not include all the parcels contained in the baseline template geographic database, those branches (i.e., entries) from the parcel index for the baseline template geographic database for which the clip database does not have parcels will be omitted in the parcel index for the clip database. Since clip databases contain whole spatial parcels from the baseline template geographic database and since each spatial parcel has its own unique range of node IDs, the same node ID ranges will be associated with the same corresponding parcel keys in the parcel index for a clip database as in the baseline template geographic database.

After a clip geographic database is formed, copies of the clip geographic database are provided to the end users (Step 126 in FIG. 1). Clip database may be provided to end users on one or more media, of any supported type, such as hard disk, DVD, CD-ROM, etc., each of which may contain all or part of the clip database.

In the end users' navigation systems 130, clip databases are used to provide navigation-related functions. As described above, an end user's navigation system includes a data access layer (340 in FIG. 7) that includes functions for locating and accessing data in a compiled geographic database and providing data from the compiled geographic database to application programs 350 in the navigation system. The data access layer 340 used with a clip database may operate similarly or identically to the data access layer used with the copy of the baseline template geographic database, as described above. The data access layer uses the spatial index, parcel index, dense tile directories, and media table of contents provided with the clip database to locate and access data contained in the clip database. When using a clip database, the data access layer accounts for the fact that the clip database does not include all the data contained in the baseline template geographic database. For example, requests for data that represent geographic features located outside the coverage region of the clip geographic database are not supported. Likewise, if the clip database does not include a functional type of data that is contained in the baseline template geographic database, requests for data of the omitted functional type are not supported.

V. Using Compiled Databases on Multiple Media

In an end user's navigation system, the compiled geographic database (a copy of the baseline template geographic database or a clip database) may be provided on a single medium (e.g., one CD-ROM disk, one DVD disk, one memory card, one hard disk, and so on). Alternatively, in an end user's navigation system, the compiled geographic database may be provided on multiple media. (One reason why the compiled geographic database used in an end user's navigation system may be provided on multiple media is that the geographic database may be too large to fit on a single medium.) If the compiled geographic database is provided on more than one media, the media may be the same type (e.g., multiple CD-ROM disks, multiple DVD disks, and so on). Alternatively, if the compiled geographic database is provided on more than one media, the media may be different types (e.g., one DVD disk and one memory card). Various combinations of multiple media may be used.

If the compiled geographic database used in an end user's navigation system is provided on multiple media, one or more parcels are located on one medium and other parcels are located on another medium. In a present embodiment, when forming and storing a compiled geographic database on multiple media, the compiler forms a parcel index and media table of contents for each of the multiple media. The parcel index and media table of contents formed for each medium include only the parcels stored on the medium. In addition, if any dense tiles are represented by data contained on the medium, the compiler forms and stores a dense tile directory for each dense tile. In a present embodiment, at least one spatial index is provided with the multiple media. In the present embodiment, the spatial index is the same spatial index used for the baseline template geographic database. As such, the spatial index provided with the multiple media refers to all the tiles in the entire coverage region represented by the baseline template geographic database. Because the spatial index provided refers to all the tiles in the entire coverage region, copies of the spatial index need not be included on each of the multiple media. Instead, one copy of the spatial index may be stored on a single one of the multiple media.

Figure 10:
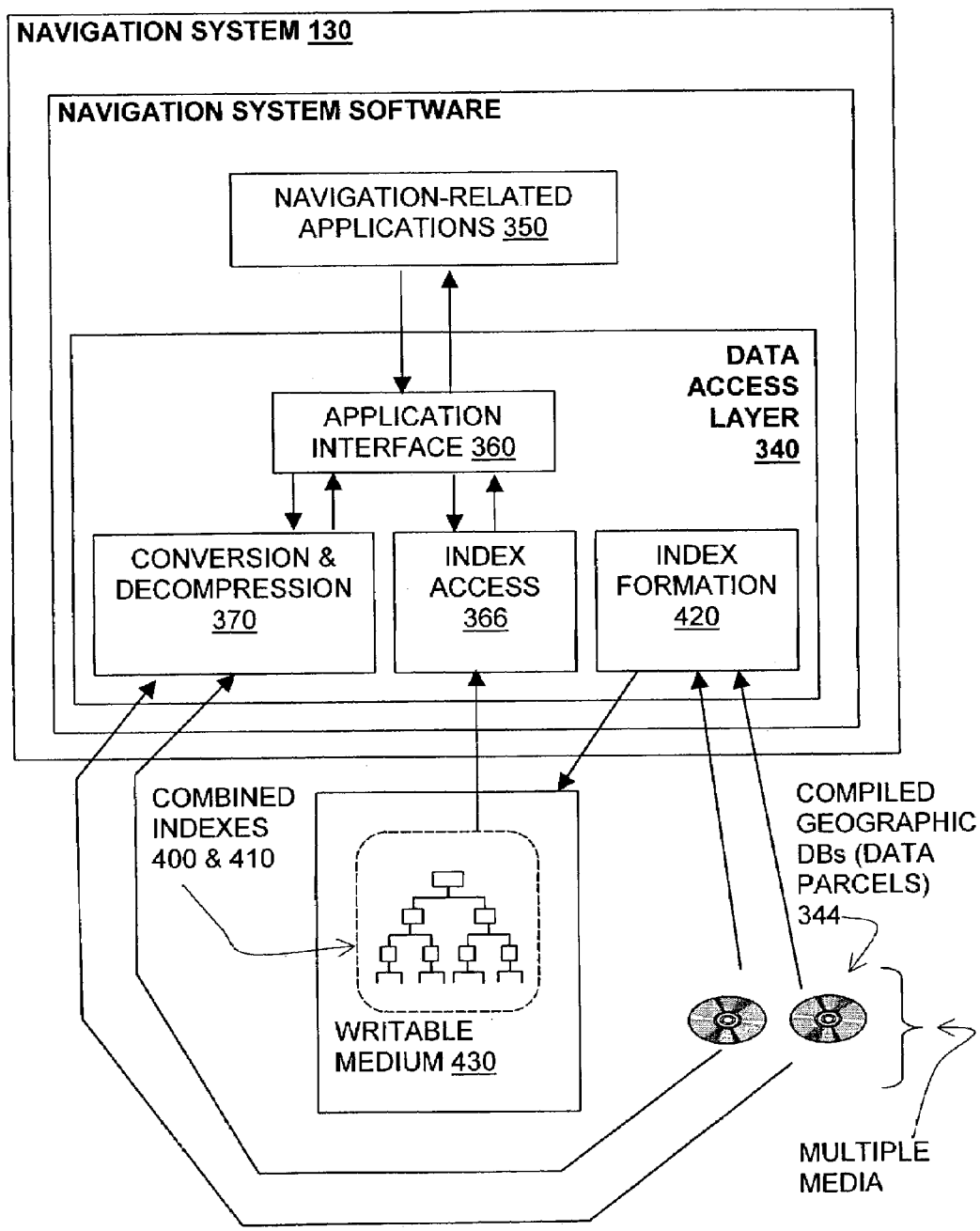
FIG. 10 is a block diagram that shows components in another embodiment of one of the end user navigation systems that uses a geographic database provided on multiple media.
Figure 11:
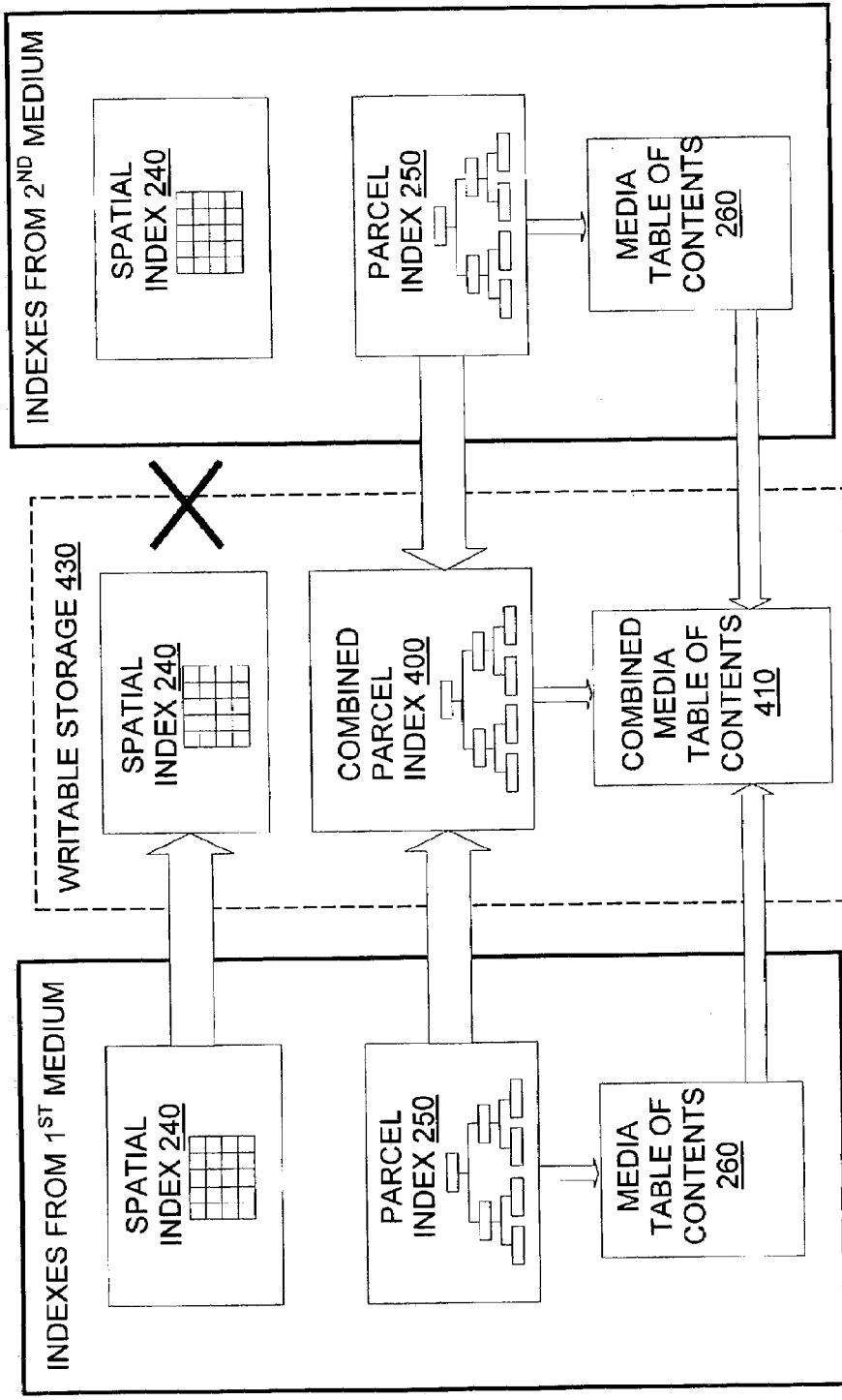
FIG. 11 is a block diagram that illustrates formation of merged indexes when data are provided on multiple media, as shown in FIG. 10.

Referring to FIGS. 10 and 11, in order to allow the end user's navigation system to use a geographic database stored on multiple media, the data access layer 340 in the end user's navigation system forms a combined parcel index 400 and media table of contents 410 when multiple media are present. The data access layer 340 includes a function 420 for this purpose.

In a present embodiment, the data access layer performs the function of forming a combined parcel index and media table of contents at run time when the navigation system is initialized. In a present embodiment, when a navigation system is being initialized and multiple media are detected, the function 420 in the data access layer 340 reads the parcel indexes and media tables of contents from each of the multiple media. Then, the data access layer forms a combined parcel index 400 and a combined media table of contents 410. The combined parcel index 400 contains all the parcel keys for all the parcels present on all the multiple media. In the combined parcel index, the parcel keys are ordered, i.e., reflecting the binary tree.

As stated above, the data access layer 340 forms a combined media table of contents 410. The combined media table of contents 410 merges the media tables of contents from the multiple media to create a combined media directory covering all media objects. In the combined parcel index 400, each parcel key refers to a media address contained in the combined media table of contents 410.

The combined parcel index 400 formed by the data access layer at run time may be stored on a writable media 430 in the navigation system or alternatively, the combined parcel index formed by the data access layer at runtime may be maintained in the memory of the navigation system. The combined parcel index is then used by the data access layer during operation of the navigation system to find parcels of data on the multiple media, as described above.

VI. Geographic Database Updates

A. General Considerations

As mentioned above in connection with FIG. 1, the source version 102 of the geographic database is updated over time for various reasons (Step 140). In order for end users to benefit from the updating of the source version 102 of the geographic database, end users are provided with updated data that reflects (e.g., corresponds to) the updating of the source version 102 of the geographic database. In one present embodiment, the entire compiled geographic database in an end user's navigation system is not replaced. Instead, according to the present embodiment, portions of the end user's geographic database are updated independently of other portions. Thus, after the updating process, the end user's navigation system uses a compiled database that includes portions that are updated and that may include portions that are not updated.

In the present embodiment, the unit of update is the parcel. The end user's database is updated by providing new, updated parcels to replace existing parcels. The new, updated parcels that are provided to the end user's navigation system are based on the same baseline parcelization pattern used for the baseline template geographic database. This means that for spatially organized data, the new, updated parcels correspond to exactly the same rectangular areas as corresponding parcels in the baseline template geographic database. In other words, each updated spatial parcel contains data that represent the geographic features contained in a rectangular area having the same boundaries as a corresponding existing spatial parcel in the baseline template geographic database.

B. Formation of Updated Parcels

Updated parcels are formed using data from the updated source database (102U in FIG. 1). A procedure for forming updated parcels is described in U.S. patent application Ser. No. 10/201,098. Updated parcels are formed using a compiler, which may be the same compiler used to form the baseline template geographic database. When forming updated parcels, the compiler uses the baseline parcelization pattern that was used to form the baseline template geographic database. As mentioned above, each parcel is identified by a baseline database version number, a parcel key, and a parcel version number. In the baseline template geographic database, the parcel version number of each parcel is zero. When forming updated parcels, each updated parcel is assigned a baseline database version number, a parcel key, and a parcel version number. In an updated parcel, the baseline database version number identifies the baseline template geographic database associated with the baseline parcelization pattern used to form the updated parcel. The parcel key assigned to an updated parcel is the same as the parcel key of the corresponding parcel in the baseline template geographic database. The parcel version number of updated parcel is incremented by one each time the parcel is updated.

When forming updated parcels, it may sometimes be necessary to add new data to represent new nodes. For example, new streets may be built in a geographic area. Data representing these new streets are added to the source geographic database, thereby forming the updated source database 102U. When forming updated parcels based on the updated source database, the compiler assigns node IDs to the new nodes. When assigning node IDs for new nodes, node IDs are selected that preserve the distinct node ID ranges associated with each of the spatial parcels. This is a reason why some node IDs are reserved at the end of each range of node IDs assigned to the nodes in each spatial parcel during formation of the baseline template geographic database. When assigning new node IDs for nodes in a rectangular area, the node IDs are selected from those reserved at the end of the range of node IDs for the parcel associated with that rectangular area. By using the node IDs reserved for a parcel, the original parcel index can continue to be used as a binary tree to identify the parcel that contains the data that represent a node, given the node ID of the node.

C. Updated Parcels Distributed with New Media

As stated above, update parcels are distributed to end users' navigation systems (Step 164 in FIG. 1). The updated parcels may be distributed to the end users in various different ways. In some embodiments, updated parcels are distributed on physical media. For example, according to these embodiments, the geographic database developer (or another entity) stores the updated parcels on a physical media, such as disks or memory cards. Then, the physical media containing the updated parcels are physically provided to the end users (or an entity operating on behalf of the end users) who install the physical media containing the updated parcels into the end users' navigation systems.

In one embodiment, updated parcels are distributed on physical media as clip databases. (Clip databases are described above.) According to this embodiment, a clip database is formed that includes updated parcels. In addition to the updated parcels, the clip database also includes a new parcel index and a new media table of contents for each dense tile represented by the data in the updated parcels. As described above, the parcel index included with a clip database includes entries for only those parcels in the clip database. Accordingly, in this embodiment, when updated parcels are provided as a clip database, the parcel index provided with the updated parcels refers only to the updated parcels. In this embodiment, a spatial index may be omitted from the clip database that contains updated parcels. Likewise, dense tile directories, if any, may be omitted from the clip database that contains updated parcels.

Once updated parcels on new media are received in the end user's navigation system, processes are performed that update the end user's geographic database using the updated parcels. In a present embodiment, these processes are performed by functions in the data access layer in the end user's navigation system.

According to one embodiment, the data access layer in the end user's navigation system constructs a single, combined parcel index and a combined media table of contents at run time. This process is similar to the process, described above, that is performed when a geographic database is provided on multiple media. In a present embodiment, this process is performed by the index formation function (420 in FIG. 10) in the data access layer 340 in the end user's navigation system. The single, combined parcel index and single, combined media table of contents are stored on writable media in the navigation system or in memory of the navigation system. The combined parcel index contains references to parcels from all of the merged partial databases, including updated parcels provided as a clip database.

When updated parcels are provided on new media, the index formation function 420 performs an additional process when a parcel on the new medium corresponds to the same rectangular geographic area as a parcel of the same type and level on the media already present in the end user's navigation system. In this case, a reference to only one of the parcels is entered into the index. The index formation function 420 selects the parcel having the newest version. In this embodiment, the older version of the parcel remains in the end user's navigation system, but is not referenced by the combined parcel index and media table of contents. Therefore, the older version of the parcel is not used.

Operation of the end user's navigation system with the combined parcel index and combined media table of contents is similar to the operation when multiple media are used, as described above. As in that embodiment, the spatial index does not need to be updated. Therefore, the spatial index provided with the older version of the geographic database can continue to be used. Similarly, any dense tile directories do not have to be updated because they contain information (i.e., sub-tiles and parcel keys) that do not change when new media are obtained.

D. Updated Parcels Distributed Without New Media

As mentioned above, updated parcels may be distributed to the end users in various different ways. Some of these ways include distributing updated parcels without new physical media. For example, updated parcels may be distributed via the Internet, e.g., where users access a web site from which updated parcels can be selected and downloaded onto a storage medium. In another embodiment, updated parcels are broadcast or otherwise transmitted wirelessly. According to this latter embodiment, end users' navigation systems include suitable wireless communications systems that enable the systems to obtain updated parcels that are transmitted wirelessly.

The medialess distribution of updated parcels to end users to replace existing, older parcels in the end users' navigation systems is similar to the distribution of updated parcels on physical media. However, when updated parcels are distributed without physical media, the updated parcels may be provided without new indexes, such as the parcel index or media table of contents. One reason that these indexes may not be provided when updated parcels are distributed medialessly is that the end users may be provided with the ability to select any combination of updated parcels, depending on various factors. Some of these factors may include the end user's expected range of travel, the type of navigation system, bandwidth considerations, and so on. Because there might be a relatively large number of different combinations of updated parcels, it may not be efficient to provide indexes with the updated parcels. Another reason is that the indexes are related to the media on which the updated parcels are stored. Accordingly, when updated parcels are distributed medialessly without new indexes, the necessary new indexes are formed in the end users' navigation systems. According to one embodiment, the index formation function (420 in FIG. 11) may perform this process, as explained below.

Another consideration associated with the distribution of updated parcels without physical media is that the updated parcels may be compressed before being transmitted. A process for compressing and decompressing an update parcel is described in U.S. patent application Ser. No. 10/201, 098. Compressing updated parcels prior to distribution may improve bandwidth utilization.

When updated parcels that have been transmitted medialessly are received in an end user's navigation system, they are decompressed (if necessary) and stored on a writeable medium in the end user's navigation system. Each updated parcel includes identifying information, including a parcel key, baseline database version number and parcel version number.

The index formation function 420 in the end user's navigation system 130 forms a new parcel index and media table of contents. When forming the new parcel index and media table of contents, the index formation function 420 uses the parcel index and media table of contents of any compiled geographic database already in the end user's navigation system. The index formation function 420 uses the parcel key, baseline database version number and parcel version number from each updated parcel to determine which existing parcels in the navigation system are being replaced with updated parcels. The index formation function 420 in the end user's navigation system 130 forms the new parcel index and media table of contents to refer to the updated parcels, when available, and to refer to the older, existing parcels if corresponding updated parcels are not available. The new parcel index and new media table of contents formed by the index formation function 420 are similar to those formed by the compiler for a clip database, as described above. When forming the new parcel index and new media table of contents, the index formation function 420 points to the media location of the most up-to-date parcel.

In this embodiment, it is not necessary to form new dense tile directories, since they do not contain media addresses, i.e., they are part of the baseline parcelization.

VII. Alternatives

In an embodiment disclosed above, it was described that a baseline template geographic database was formed from the source version of the geographic database. In one embodiment, the baseline template geographic database includes all the data from the source version of the geographic database. In an alternative embodiment, the baseline template geographic database includes only a portion of the data from the source version of the geographic database. If the baseline template geographic database is formed that includes only a portion of the data from the source version of the geographic database, at least a sufficient portion of data from the source version of the geographic is used to form the baseline parcelization pattern.

In another alternative embodiment, the baseline parcelization pattern is determined and the indexes formed without actually forming a baseline template geographic database. According to this alternative, the boundaries of the rectangular areas corresponding to spatial parcels and the node ID ranges for each parcel are determined and stored in a metadata file without actually forming any parcels containing actual data entities. Clip databases and update parcels are then formed by referring the metadata for a baseline template geographic database.

The parcelization process (178 in FIG. 2) includes formation of both spatial parcels and non-spatial parcels. Clip databases and parcel updates may include non-spatial parcels of data. Non-spatial parcels of data are treated similarly as spatial parcels. For non-spatial parcels, the same values of the attributes used to define the boundaries of the parcels are used in forming updated parcels.

Whenever the parcelization is changed, a new baseline template geographic database is created. A new baseline database version number will be applied.

In one of the embodiments disclosed above, it was described that a clip database uses the same spatial index as the baseline template geographic database. In an alternative embodiment, a new spatial index is formed for a clip database and the new spatial index is distributed for use with the clip database in the end user's navigation system. The new spatial index may include only the tiles associated with the coverage region of the clip database.

In some of the embodiments disclosed above, it was stated that a dense tile directory was formed to access parcels of data that represent rectangular areas formed from dense tiles. In an alternative embodiment, other methods may be used that do not parcelize dense areas differently than sparse areas or that include the formation of a separate index, such as a dense tile directory, for accessing parcels located in a dense area.

Some of the disclosed embodiments have the advantage that multiple partial databases can be extracted from the baseline database and used independently. Because the extracted parcels are consistent across the partial databases, one or more partial databases can be merged into a single database, as long as they correspond to the same baseline parcelization. The extract parcels may be stored on separate media.

It is intended that the foregoing detailed description be regarded as illustrative rather than limiting and that it is understood that the following claims including all equivalents are intended to define the scope of the invention.

I claim:

1. A computer-implemented method for using multiple map databases in a navigation system, wherein each map database contains data that represent geographic features located within a respective coverage region associated therewith, wherein the method comprises:

forming a combined parcel index from parcel indexes associated with each of said multiple map database, wherein the combined parcel index associates parcel keys with media addresses, wherein each parcel key identifies a parcel from one of said multiple map databases, wherein the parcel so identified comprises a collection of data that represents geographic features located within a separate one of a plurality of distinct geographic areas into which the coverage regions of the map databases are divided; and using the combined parcel index to access a selected parcel from the media address associated with the selected parcel.

2. The computer-implemented method of claim 1 wherein one of the multiple map databases is stored on a first computer-readable data storage medium and another of the multiple map databases is stored on a second computer-readable data storage medium that is different from the first computer-readable data storage medium.

3. The computer-implemented method of claim 1 further comprising:

forming a combined media table of contents that identifies a media path associated with each of the multiple map databases, wherein said combined parcel index refers to said combined media table of contents for said media path.

4. The computer-implemented method of claim 1 further comprising:

using a spatial index that associates parcel keys with geographic locations.

5. The computer-implemented method of claim 4 wherein said parcel keys in said spatial index refer to tiles in a grid, and wherein the plurality of geographic areas are defined along said grid.

6. The computer-implemented method of claim 1 wherein said step of forming is performed at run time in said navigation system.

7. The computer-implemented method of claim 1 wherein said combined parcel index is stored on a writable data storage medium in said navigation system.

8. The computer-implemented method of claim 1 wherein said combined parcel index is maintained in a memory in said navigation system.

9. The computer-implemented method of claim 1 further comprising the step of:
upon determining that more than one of said multiple map databases include collections of data that represent geographic features located within the same distinct geographic area, associating the parcel key in the combined parcel index with the media address of the collection of data that is most up-to-date.

10. The computer-implemented method of claim 1 wherein the coverage regions of said multiple map databases overlap to some extent.

11. The computer-implemented method of claim 1 wherein one of the multiple map databases is more up-to-date than another of the multiple map databases.

12. The computer-implemented method of claim 1 further comprising:
using the parcel index as a binary free for ranges of data entity identifiers associated with nodes of the parcel index that represent parcels containing said data entity identifiers.

13. A computer database for containing data that represent geographic features located in a coverage region and organized to provide navigation-related features, the database comprising:
a plurality of parcels, wherein each parcel contains a plurality of data entities, wherein the data entities in a parcel represent those geographic features located in a separate respective one of a plurality of geographic sub-regions into which coverage region is divided,
a non-updateable spatial index that identifies which parcel of the plurality of parcels contains the data that represent geographic features identified by location; and
an updatable parcel index that identifies a media address for each parcel.

14. The computer database of claim 13 further comprising:
a media table of contents, referenced by the updatable parcel index, that identifies each path where parcels of data that form the geographic database are located on media.

15. The computer database of claim 13 wherein a portion of said plurality of parcels is located on one data storage medium and another portion of said plurality of parcel is located on another, different data storage medium.

16. The computer database of claim 13 wherein said updatable parcel index also identifies distinct ranges of data entity identifiers associated with each parcel.

17. The computer database of claim 16 wherein said updatable parcel index can be used as a binary tree for finding parcels using said data entity identifiers.

18. The computer database of claim 13 wherein said updatable parcel index is stored on a re-writable medium in a navigation system.

19. The computer database of claim 13 wherein parcels are identified in said parcel index in order by parcel ID, wherein the parcel ID of a parcel indicates a relative position of the geographic sub-region corresponding to the parcel in a binary tree that represents the divisions of the coverage region that formed the geographic sub-region.

20. A computer-implemented method for distributing geographic databases comprising:
forming a baseline parcelization pattern, wherein the baseline parcelization pattern represents a separation of data in a baseline geographic database into separate groupings, wherein each grouping contains data that represent geographic features located in a separate respective distinct one of a plurality of geographic sub-regions into which a coverage region represented by the baseline geographic database is divided;
forming a first clip database, wherein the first clip database includes data entities separated into separate groupings conforming to said baseline parcelization pattern, wherein said first clip database contains data that represent geographic features located in a first sub-region, wherein said first sub-region is within, but less extensive than, said coverage region of the baseline geographic database; and
forming a second clip database, wherein the second clip database includes data entities separated into separate groupings conforming to said baseline parcelization pattern, wherein said second clip database contains data that represent geographic features located in a second sub-region, wherein said second sub-region is within, but less extensive than, said coverage region of the baseline geographic database; and wherein said first sub-region and said second sub-region do not coincide.

* * * * *